UNITED STATES PATENT OFFICE.

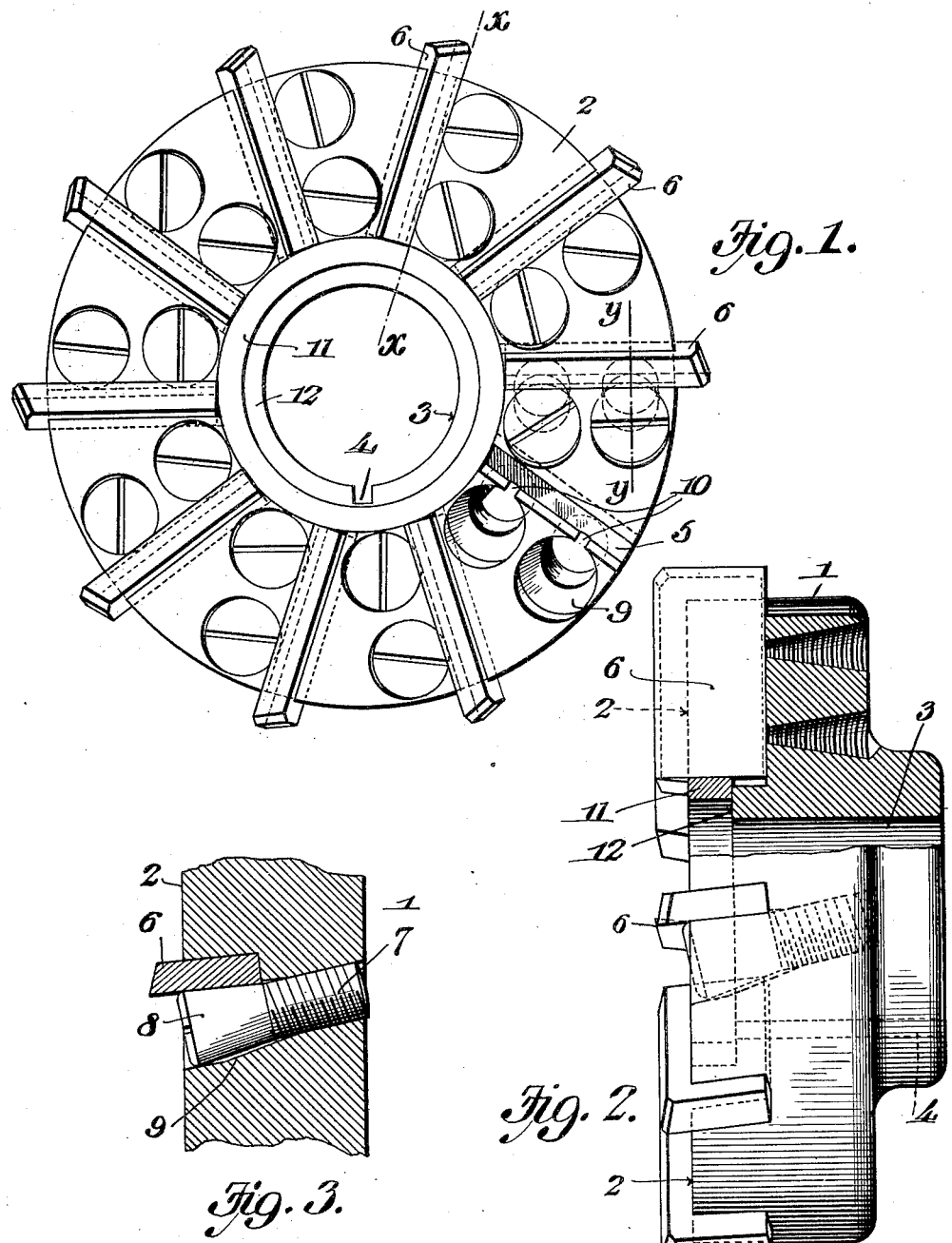

SAMUEL S. BOLTON, OF CLEVELAND, OHIO.

MILLING-MACHINE HEAD.

1,089,527. Specification of Letters Patent. Patented Mar. 10, 1914.

Application filed July 5, 1913. Serial No. 777,470.

*To all whom it may concern:*

Be it known that I, SAMUEL S. BOLTON, a citizen of the United States, residing at Cleveland, county of Cuyahoga, and State of Ohio, have invented certain new and useful Improvements in Milling-Machine Heads, of which the following is a specification.

My invention relates to milling cutters and particularly to the arrangement of the blades in the head and the manner of securing the same therein.

In the devices of the character under consideration such as are now in general use, it has been found difficult to hold the blades firmly in position to insure perfect and accurate work, particularly on heavy cuts. Furthermore, the means employed for holding the blades, such as tapered pins have been found to injure the cutting heads so that it is difficult to replace a blade or blades when the same become worn or broken.

It is the object of the present invention to provide means for securing the blades firmly in the head whereby accurate work is insured either on light or heavy cuts and to provide such means for holding the blades whereby the cutter head will not become injured by the securing means.

A further object of my invention is to provide a device of the character mentioned wherein the blades may be readily removed and replaced when necessary.

A still further object of my invention is to provide a device of the class mentioned in which blades varying in thickness may be readily secured in the head.

Other objects will appear hereinafter.

With these objects in view my invention consists generally in providing a cutter head with blade receiving recesses arranged at an angle to the plane of rotation and equipped with taper headed screws arranged at a greater angle than the recesses with the sides of the taper heads adapted to engage the faces of the several blades.

My invention further consists in a device as above stated further characterized by an inserted ring engaging the inner ends of the blades preventing longitudinal movement of the blades in the recesses.

My invention further consists in various details of construction and arrangements of parts all as will be fully described hereinafter, and particularly pointed out in the claims.

My invention will be more readily understood by reference to the accompanying drawings, forming a part of this specification and in which:

Figure 1 is a face view of a milling cutter embodying my invention in its preferred form, one of the blades and its retaining screws being removed for the purpose of better illustration of the cutting head, Fig. 2 is a side elevation of the same, a portion being shown in section, the section being taken on substantially the line $x$—$x$ of Fig. 1, and Fig. 3 is a detail section on the line $y$—$y$ of Fig. 1.

Referring now to the drawings 1 indicates the milling head which comprises a substantially cylindrical body, having a plane outer face 2 and provided with a centrally disposed opening 3 to receive the spindle to which it is keyed, 4 indicating a key way. The head 1 is provided with a plurality of blade receiving recesses 5, which are arranged with the forward edge or face substantially radial and which extend inwardly from the face 2 at an angle to the plane thereof, which is also the plane of rotation.

6 indicates the blades.

Tapped into the head 1 are screws 7 which are at a still greater angle than that of the blades 6 and provided with tapered or conical heads 8 which bear against the adjacent faces of the blades. By referring to Fig. 1 of the drawing and particularly to the recess from which the blade has been removed, it will be seen that the conical recesses 9 for the heads 8 communicate with the blade receiving recesses 5 through the gaps 10 formed by the intersection of the adjacent walls of said recesses.

To prevent longitudinal movement of the blades inwardly the head 1 is provided with an inserted ring 11 against which the inner ends of the blades 6 abut. The ring 11 is arranged in a cylindrical recess 12 formed in the outer face 2 of the cutter head and preferably has its outer face flush with the face 2.

It should be noted that the blades 6 are made from flat stock without shaping except as to the cutting edges and ends and it is obvious that blades made from stock of varying thickness may be securely held in position by means above described. Furthermore, by arranging the blades at an angle to the plane of rotation and the securing screws at a greater angle, there is no possibility of the blades rising out of the recesses even when making heavy cuts. Obviously the ring 11 accurately positions the blades longitudinally of the recess and prevents inward movement of the blades when in use. Also, the blades may be readily removed and replaced when necessary and the securing means does not and cannot injure the cutting head.

I claim:

1. A milling head comprising a cylindrical body having a plane outer face, and being provided with blade receiving recesses in said head at an angle to said face, blades in said recesses, screws tapped into said head at an angle to said blades and provided with conical heads engaging the faces of the respective blades, substantially as described.

2. A milling head comprising a cylindrical body having a plane outer face and provided with a plurality of substantially radially disposed blade receiving recesses, said recesses being arranged at an angle to the plane of rotation of said head, and having parallel side walls, blades arranged in said recesses, said blades being of substantially uniform thickness throughout, screws tapped into said head at an angle to said blades and provided with conical heads engaging the forward faces of said blades, substantially as described.

In testimony whereof I have signed my name to this specification in the presence of two subscribing witnesses.

SAMUEL S. BOLTON.

Witnesses:
HERBERT M. MCGEORGE,
FRANK PETTIBONE.

Copies of this patent may be obtained for five cents each, by addressing the "Commissioner of Patents, Washington, D. C."